United States Patent
Nagasawa

(10) Patent No.: US 9,225,588 B2
(45) Date of Patent: Dec. 29, 2015

(54) ALARM MANAGEMENT APPARATUS AND METHOD FOR MANAGING ALARMS

(71) Applicant: FUJITSU LIMITED, Kawasaki-shi, Kanagawa (JP)

(72) Inventor: Hidemasa Nagasawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 114 days.

(21) Appl. No.: 14/088,723

(22) Filed: Nov. 25, 2013

(65) Prior Publication Data

US 2014/0204726 A1  Jul. 24, 2014

(30) Foreign Application Priority Data

Jan. 23, 2013  (JP) .................................. 2013-010434

(51) Int. Cl.
*H04L 12/00* (2006.01)
*H04L 29/00* (2006.01)
*H04L 12/24* (2006.01)

(52) U.S. Cl.
CPC .......... *H04L 41/0604* (2013.01); *H04L 41/065* (2013.01); *H04L 41/0613* (2013.01); *H04L 41/0627* (2013.01); *H04L 41/0654* (2013.01); *H04L 41/0686* (2013.01)

(58) Field of Classification Search
None
See application file for complete search history.

(56) References Cited

U.S. PATENT DOCUMENTS

| | | | | |
|---|---|---|---|---|
| 6,601,185 | B1* | 7/2003 | Bass et al. | 714/4.12 |
| 6,748,432 | B1* | 6/2004 | Du et al. | 709/224 |
| 7,043,661 | B2* | 5/2006 | Valadarsky et al. | 714/4.1 |
| 2007/0222576 | A1* | 9/2007 | Miller et al. | 340/506 |
| 2007/0223917 | A1* | 9/2007 | Nagamine | 398/1 |
| 2008/0307272 | A1* | 12/2008 | Ozawa | 714/48 |
| 2008/0316013 | A1* | 12/2008 | Soderkvist et al. | 340/501 |
| 2010/0019894 | A1 | 1/2010 | Okada | |
| 2010/0128611 | A1 | 5/2010 | Deguchi | |

FOREIGN PATENT DOCUMENTS

| | | |
|---|---|---|
| JP | 6-29990 | 2/1994 |
| JP | 9-282252 | 10/1997 |
| JP | 2010-33118 | 2/2010 |
| JP | 2010-124428 | 6/2010 |

* cited by examiner

*Primary Examiner* — Robert C Scheibel
(74) *Attorney, Agent, or Firm* — Staas & Halsey LLP

(57) ABSTRACT

An alarm management apparatus includes a processor. The processor is configured to receive alarms notified upon a plurality of communication apparatuses detecting a failure. The alarms include identification information for identifying types of the respective alarms. Each of the plurality of communication apparatuses is included in one of a plurality of communication networks. The processor is configured to check development situations of respective types of alarms received from each of the plurality of communication networks on basis of the identification information to identify a particular communication network and a particular type of alarms. The processor is configured to cause a first relay apparatus of a plurality of relay apparatuses to discard first alarms of the particular type. The first alarms are notified from a first communication apparatus included in the particular communication network. The first communication apparatus is not adjacent to a development location of the failure.

15 Claims, 16 Drawing Sheets

FIG. 3

| GENERAL CLASSIFICATION | INTERMEDIATE CLASSIFICATION | PORT NUMBER | REMARK |
|---|---|---|---|
| ALARM | PRIMARY ALARM | 10000 | LOS, LOF, AND THE LIKE |
| | SECONDARY ALARM | 10100 | AIS, RDI, AND THE LIKE |
| EVENT | NOTIFICATION | 10200 | SWITCHING NOTIFICATION AND THE LIKE |
| PM | PERIODIC COLLECTION | 10300 | PM DATA |
| | THRESHOLD EXCESS NOTIFICATION | 10400 | TCA |

FIG. 5A

| NETWORK ID | PRIMARY ALARM NUMBER | SECONDARY ALARM NUMBER | PREVIOUS SECONDARY ALARM NUMBER | DISCREPANCY |
|---|---|---|---|---|
| 0001 | 0 | 0 | 0 | 0 |
| 0002 | 1 | 59 | 6 | 53 |
| 0003 | 2 | 198 | 198 | 0 |
| 0004 | 0 | 0 | 1 | -1 |
| 0005 | 0 | 3 | 3 | 0 |

FIG. 5B

| NE ID | NETWORK ID | NETWORK NAME |
|---|---|---|
| F001 | 0001 | FUKUOKA |
| ⋮ | ⋮ | ⋮ |
| T001 | 0002 | TOKYO |
| T002 | 0002 | TOKYO |
| T003 | 0002 | TOKYO |
| T004 | 0002 | TOKYO |
| ⋮ | ⋮ | ⋮ |

FIG. 5C

| MANAGEMENT ID | NE NAME | ADDRESS |
|---|---|---|
| F001 | FUKUOKA GNE 1 | *.*.*.*** |
| ⋮ | ⋮ | ⋮ |
| T001 | TOKYO GNE 1 | *.*.*.*** |
| T002 | TOKYO RNE 1 | *.*.*.*** |
| T003 | TOKYO RNE 2 | *.*.*.*** |
| T004 | TOKYO GNE 2 | *.*.*.*** |
| ⋮ | ⋮ | ⋮ |

FIG. 7A

| PORT NUMBER | TARGET NETWORK | CONTROL CONTENT |
|---|---|---|
| 10000 | ALL | TRANSFER TO EMS SERVER |
| 10100 | ALL | TRANSFER TO EMS SERVER |
| 10200 | ALL | TRANSFER TO EMS SERVER |
| 10300 | ALL | TRANSFER TO EMS SERVER |
| 10400 | ALL | TRANSFER TO EMS SERVER |

FIG. 7B

| PORT NUMBER | TARGET NETWORK | CONTROL CONTENT |
|---|---|---|
| 10000 | ALL | TRANSFER TO EMS SERVER |
| 10100 | 0002 | DISCARD |
| 10200 | 0002 | DISCARD |
| 10300 | 0002 | DISCARD |
| 10400 | 0002 | DISCARD |

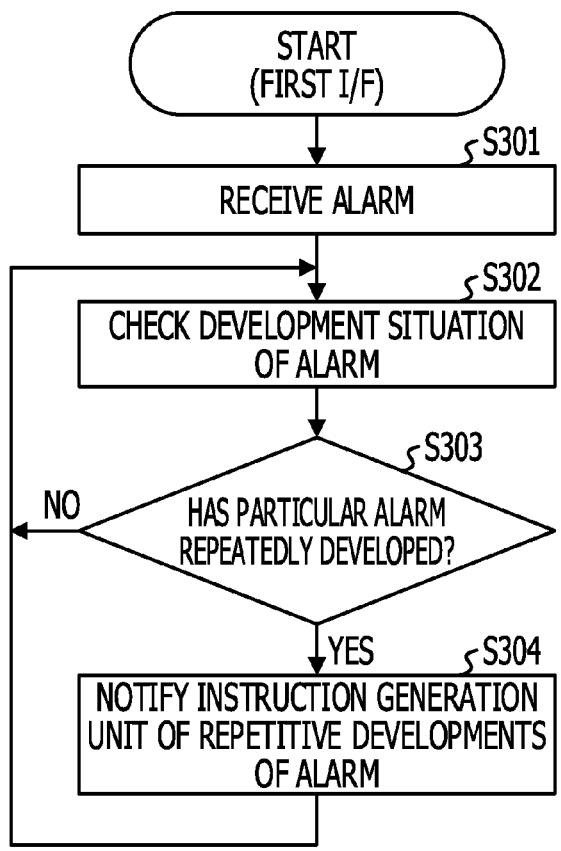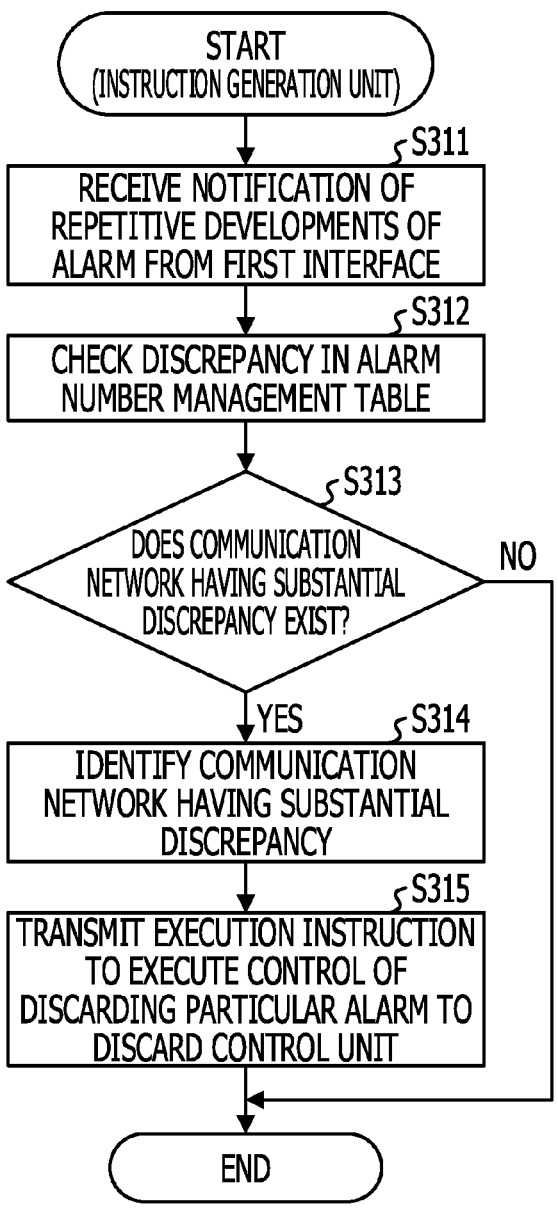
FIG. 12A
FIG. 12B

ALARM MANAGEMENT APPARATUS AND METHOD FOR MANAGING ALARMS

CROSS-REFERENCE TO RELATED APPLICATION

This application is based upon and claims the benefit of priority of the prior Japanese Patent Application No. 2013-010434, filed on Jan. 23, 2013, the entire contents of which are incorporated herein by reference.

FIELD

The embodiments discussed herein are related to an alarm management apparatus and a method for managing alarms.

BACKGROUND

A technique for a management apparatus to manage a transmission network including plural transmission apparatuses has been proposed. According to the technique, when a failure such as a disconnection between the transmission apparatuses develops in the transmission network, for example, a transmission apparatus adjacent to a failure development location detects a loss of signal (LOS). The transmission apparatus that has detected the LOS notifies the management apparatus of that effect as an alarm. A transmission apparatus other than the transmission apparatus that has performed the notification of the LOS detection detects an alarm indication signal (AIS) or a remote defect indication (RDI) on the basis of the detection of the LOS. The transmission apparatus that has detected the AIS or the RDI notifies the management apparatus of that effect as an alarm. The management apparatus is notified of a large amount of alarms in this manner.

Techniques for reducing loads on the management apparatus with respect to the alarms have also been proposed. For example, the transmission apparatus adjacent to the failure development location performs a mask control on alarms notified to the management apparatus to carry out a control so that the management apparatus is not notified of the alarms, or a management that utilizes polling with respect to the managed apparatuses is restricted in accordance with a situation of loads in a network to reduce the loads in the network.

Related techniques are disclosed in, for example, Japanese Laid-open Patent Publication No. 2010-124428 and Japanese Laid-open Patent Publication No. 9-282252.

However, according to the above-mentioned techniques, a transmission apparatus other than the transmission apparatus adjacent to the failure development location does not perform the mask control and thus notifies the management apparatus of the alarms such as the AIS or the RDI, for example. Since these alarms do not uniquely identify the development location of the failure, a prompt identification of the development location of the failure is interfered. In addition, the transmission apparatus adjacent to the development location of the failure holds back, by the mask control, the notification of the alarm that identify the development location of the failure such as the LOS, for example. For this reason, it is significantly difficult to identify the development location of the failure.

SUMMARY

According to an aspect of the present invention, provided is an alarm management apparatus including a processor. The processor is configured to receive alarms notified upon a plurality of communication apparatuses detecting a failure. The alarms include identification information for identifying types of the respective alarms. Each of the plurality of communication apparatuses is included in one of a plurality of communication networks. The processor is configured to check development situations of respective types of alarms received from each of the plurality of communication networks on basis of the identification information to identify a particular communication network and a particular type of alarms. The processor is configured to cause a first relay apparatus of a plurality of relay apparatuses to discard first alarms of the particular type. The first alarms are notified from a first communication apparatus included in the particular communication network. The first communication apparatus is not adjacent to a development location of the failure. The plurality of relay apparatuses are configured to relay alarms notified from the plurality of communication apparatuses to the alarm management apparatus.

The objects and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates an example of a classification table;

FIG. 5A illustrates an example of an alarm number management table;

FIG. 5B illustrates an example of a monitoring target network table;

FIG. 5C illustrates an example of a monitoring target NE table;

FIG. 7A illustrates an example of a control table;

FIG. 7B illustrates an example of a control table;

FIG. 12A is a flow chart for exemplifying a process flow of a method for managing alarms executed by a first I/F at the time of a failure development;

FIG. 12B is a flow chart for exemplifying a process flow of a method for managing alarms executed by an instruction generation unit at the time of a failure development;

DESCRIPTION OF EMBODIMENTS

Hereinafter, embodiments for carrying out the present technology will be described with reference to the drawings.

Figure 1:
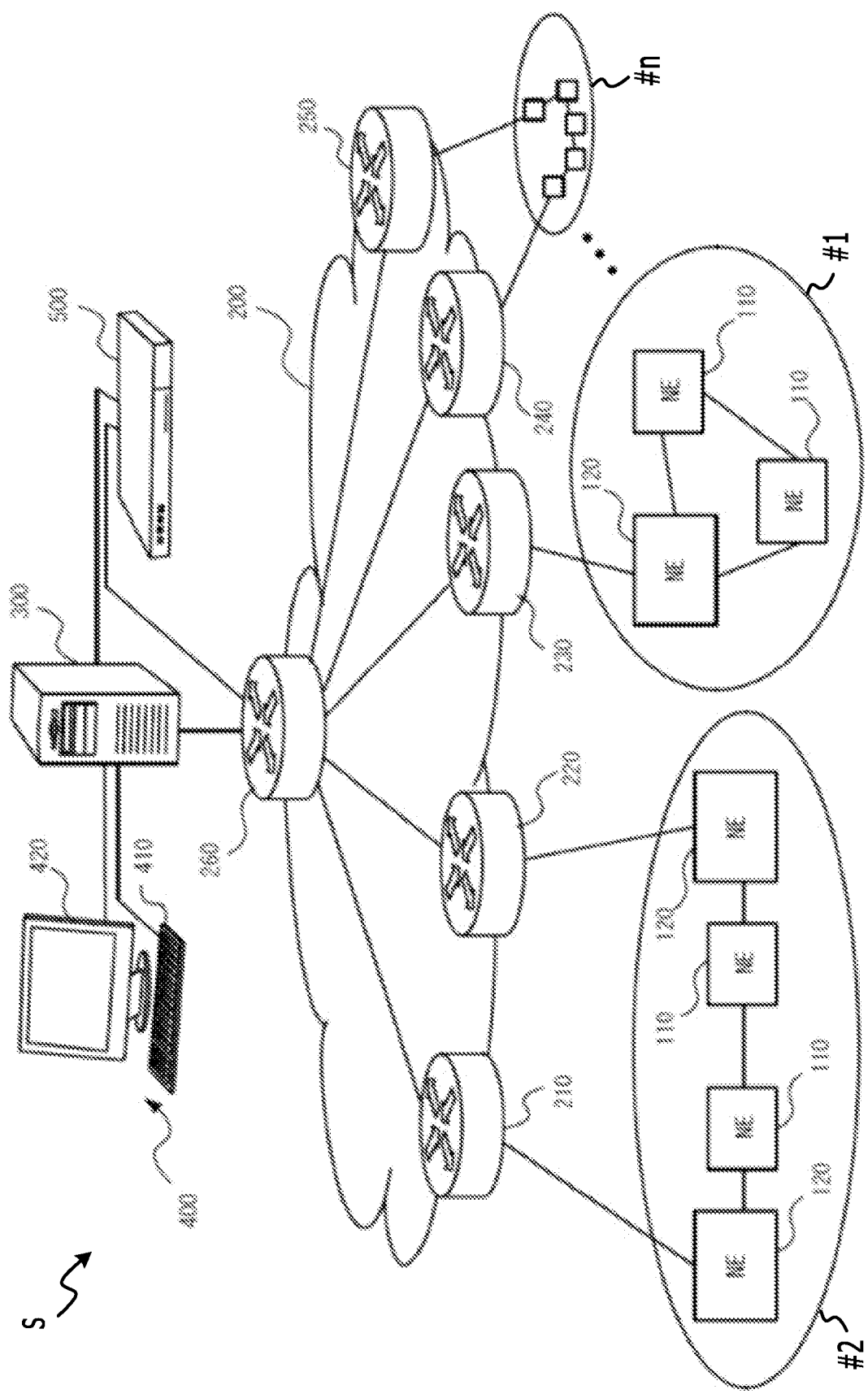
FIG. 1 illustrates a configuration of a monitoring system according to an embodiment.

FIG. 1 illustrates a configuration of a monitoring system S according to an embodiment. As illustrated in FIG. 1, the monitoring system S includes plural communication networks #1 to #n, a data communication network (DCN) 200, an element management system (EMS) server 300, a human machine interface (HMI) terminal 400, and an OpenFlow controller 500.

First, configurations of the communication networks #1 to #n will be described.

Each of the plural communication networks #1 to #n includes network elements (NEs) 110 and 120. The NE 110 is an NE that does not have a direct communication route with the EMS server 300. The NE 110 is referred to as remote NE 110, for example. On the other hand, the NE 120 is an NE that has a direct communication route with the EMS server 300. The NE 120 is referred to as gateway NE, for example. A signal is transmitted between the NEs within the communication network by a communication system (communication protocol) based on an in-band system such as a data communication channel (DCC) or an optical supervisory channel (OSC). The communication network is also referred to as a transmission network, for example.

The NE 110 and the NE 120 are connected to each other by various connection modes in the communication network. One example is, as represented by the communication network #1, a ring-shaped connection mode in which the NEs 110 are connected to each other, and each of the NEs 110 is connected to the single NE 120. Another example is, as represented by the communication network #2, a serial-manner connection mode in which the NEs 110 are connected to each other, one of the NEs 110 is connected to the NE 120, and the other NE 110 is connected to the other NE 120. A connection line includes, for example, an optical fiber. The NE is a communication apparatus that realizes a function used for providing a communication service and corresponds, for example, to a transmission apparatus, a switching equipment, a wireless apparatus, and the like. The transmission apparatus includes an optical transmission apparatus.

Next, the DCN 200 will be described.

The DCN 200 is a monitoring and controlling network provided to monitor and control the communication networks #1 to #n. The DCN 200 is formed by an intranet including a local area network (LAN) or by the internet. The DCN 200 includes plural OpenFlow switches 210 to 260.

The OpenFlow switches 210 to 260 are switches controlled at Layer 3 and Layer 4 of the Open Systems Interconnection (OSI) reference model and compatible with a software-defined network (SDN). The OpenFlow switches 210 to 260 transfer a packet such as an alarm or an event in accordance with an instruction transmitted from the OpenFlow controller 500. The OpenFlow switches 210 to 260 may be hardware switches or may also be software switches. The packet is transferred between the OpenFlow switches 210 to 260 by a Transmission Control Protocol/Internet Protocol (TCP/IP) communication.

The OpenFlow switches 210 to 250 are connected to the NEs 120. For example, the OpenFlow switches 210 and 220 are connected to the NEs 120 included in the communication network #2. The OpenFlow switch 230 is connected to the NE 120 included in the communication network #1. On the other hand, the OpenFlow switches 210 to 250 are also connected to the OpenFlow switch 260. The OpenFlow switch 260 is connected to the EMS server 300 and the OpenFlow controller 500. A connection mode of the OpenFlow switches 210 to 260 is not limited to the connection mode illustrated in FIG. 1.

Subsequently, configurations of the above-mentioned NEs 110 and 120 will be described with reference to FIGS. 2A and 2B and FIG. 3.

Figure 2A:
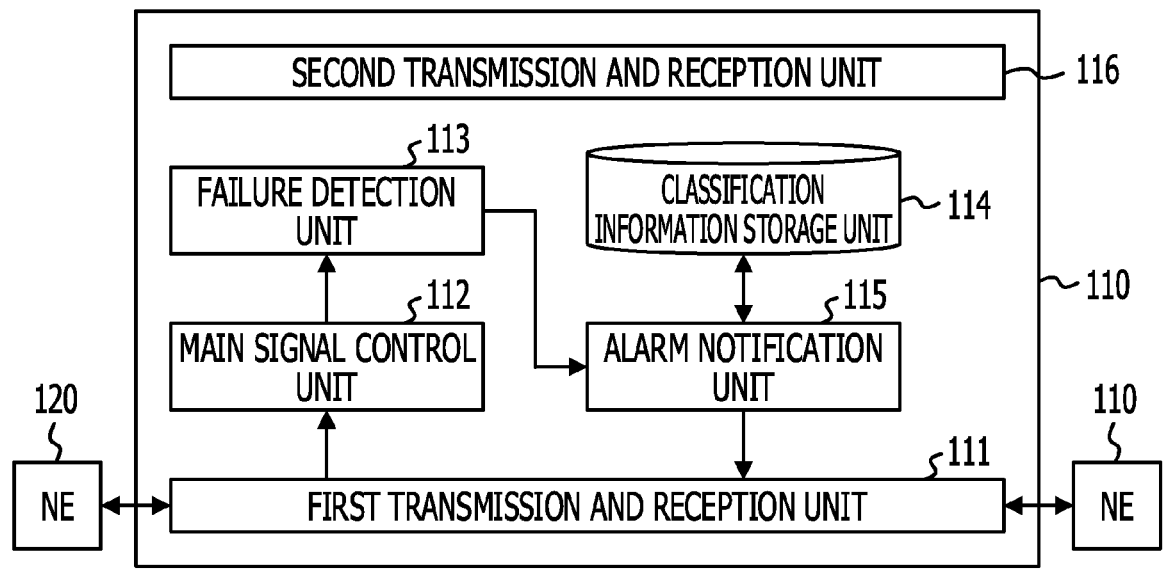
FIG. 2A is an exemplary block diagram of a remote NE.

FIG. 2A is an exemplary block diagram of the remote NE 110. FIG. 2B is an exemplary block diagram of the gateway NE 120. FIG. 3 illustrates an example of a classification table. The remote NE 110 and the gateway NE 120 may function as the remote NE 110 or the gateway NE 120 depending on the connection mode within the communication network. Therefore, the remote NE 110 and the gateway NE 120 basically have a similar configuration.

First, the remote NE 110 will be described.

As illustrated in FIG. 2A, the remote NE 110 includes a first transmission and reception unit 111, a main signal control unit 112, a failure detection unit 113, a classification information storage unit 114, an alarm notification unit 115, and a second transmission and reception unit 116.

The first transmission and reception unit 111 is configured to transmit and receive a main signal and control information flowing within the communication network. That is, the first transmission and reception unit 111 is an interface for communications within the communication network. For this reason, another remote NE 110 and a gateway NE 120 are connected to the first transmission and reception unit 111. In a case where an alarm is received from the alarm notification unit 115 which will be described below, the first transmission and reception unit 111 transmits the alarm towards the EMS server 300.

The main signal control unit 112 obtains the main signal and the control information received by the first transmission and reception unit 111. In a case where the main signal is obtained, the main signal control unit 112 executes various types of control processing on the main signal in accordance with a specification of the remote NE 110. The control processing includes, for example, delay processing, noise removal, and the like. In a case where the control information is obtained, the main signal control unit 112 controls an internal operation of the remote NE 110 on the basis of the control information.

The failure detection unit 113 is configured to detect a failure of the connection line and a recovery thereof. For example, when the optical fiber that connects the remote NEs 110 to each other is disconnected, the LOS is detected as a failure. For example, when the optical fiber is changed and restoration from the failure is attained, the failure recovery is detected.

The classification information storage unit 114 stores the classification table. As illustrated in FIG. 3, the classification table includes items of a general classification, an intermediate classification, a port number (logical port number), and a remark. In the item of the general classification, information is classified in terms of functions such as, for example, "alarm function", "event function", and the like. In the item of the intermediate classification, for example, "alarm function" is classified into "primary alarm", "secondary alarm", or the like, so that a finer classification than the general classification is carried out. An individual port number is allocated to each item of the intermediate classification. In the item of the remark, a content corresponding to the item of the intermediate classification is indicated. For example, the LOS and a loss of frame (LOF) correspond to the primary alarm. The AIS and the RDI correspond to the secondary alarm. A switching notification corresponds to the notification. Recovery notifications notified in a case where the failure is recovered are classified into port numbers corresponding to respective alarms. For example, a first recovery notification corresponding to the primary alarm is classified into a port number "10000". A second recovery notification corresponding to the secondary alarm is classified into a port number "10100".

In a case where the failure detection unit 113 detects a failure, the alarm notification unit 115 notifies the EMS server 300 of the failure detection as an alarm. At this time, the alarm notification unit 115 checks the classification information storage unit 114 and attaches, to the alarm, identification information in accordance with a type of the alarm. For example, in a case where the LOS is detected by the failure detection unit 113, port number "10000" is attached to the alarm as the identification information. In this case, the alarm is notified as the primary alarm. On the other hand, in a case where the failure recovery is detected by the failure detection unit 113, the alarm notification unit 115 notifies the EMS server 300 of restoration from the failure as a recovery notification. At this time, the alarm notification unit 115 checks the classification information storage unit 114 and attaches the identification information in accordance with the restoration to the recovery notification. For example, in a case where the failure recovery is detected by the failure detection unit 113, the port number "10000" is attached to the recovery notification as the identification information.

The second transmission and reception unit 116 is an interface for communications with the outside of the communication network. Since the remote NE 110 is not connected to an apparatus outside the communication network, the transmission and reception processing is not executed.

Next, the gateway NE 120 will be described.

Figure 2B:
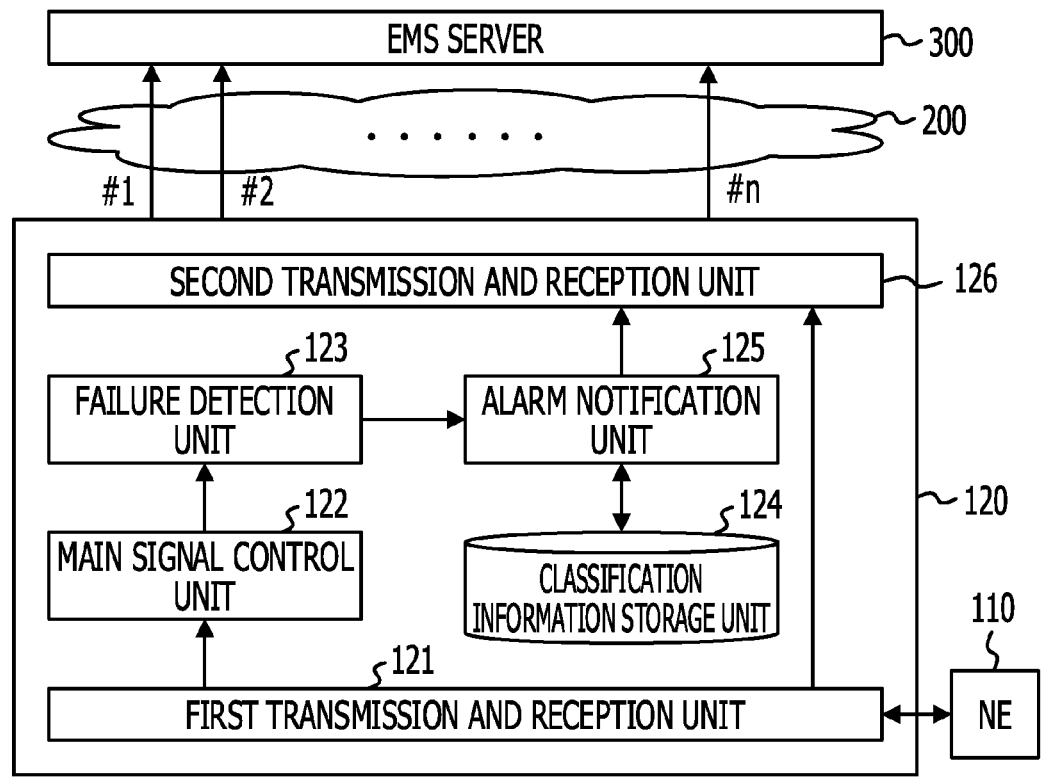
FIG. 2B is an exemplary block diagram of a gateway NE.

As illustrated in FIG. 2B, the gateway NE 120 includes a first transmission and reception unit 121, a main signal control unit 122, a failure detection unit 123, a classification information storage unit 124, an alarm notification unit 125, and a second transmission and reception unit 126.

The first transmission and reception unit 121 is configured to transmit and receive the main signal and the control information flowing within the communication network. That is, the first transmission and reception unit 121 is an interface for communications within the communication network. For this reason, a remote NE 110 is connected to the first transmission and reception unit 121. In a case where a primary alarm is received from the NE 110, the first transmission and reception unit 121 transmits the primary alarm to the main signal control unit 122 and the second transmission and reception unit 126.

The main signal control unit 122 obtains the main signal and the control information received by the first transmission and reception unit 121. In a case where the main signal is obtained, the main signal control unit 122 executes various types of control processing on the main signal in accordance with a specification of the gateway NE 120. The control processing is as described above. In a case where the control information is obtained, the main signal control unit 122 controls an internal operation of the gateway NE 120 on the basis of the control information.

The failure detection unit 123 is configured to detect a failure of the connection line. For example, in a case where a primary alarm is transmitted to the main signal control unit 122, an AIS or an RDI is detected as a failure. When restoration from the failure is attained, the failure recovery is detected.

The classification information storage unit 124 stores the classification table. The classification table is as described above with reference to FIG. 3.

In a case where the failure detection unit 123 detects a failure, the alarm notification unit 125 notifies the EMS server 300 of the failure detection as an alarm. At this time, the alarm notification unit 125 checks the classification information storage unit 124 and attaches, to the alarm, identification information in accordance with a type of the alarm. For example, in a case where the AIS or the RDI is detected by the failure detection unit 123, a port number "10100" is attached to the alarm as the identification information. In this case, the alarm is notified as the secondary alarm. On the other hand, in a case where the failure recovery is detected by the failure detection unit 123, the alarm notification unit 125 notifies the EMS server 300 of the restoration from the failure as a recovery notification. At this time, the alarm notification unit 125 checks the classification information storage unit 124 and attaches the identification information in accordance with the restoration to the recovery notification. For example, in a case where the failure recovery is detected by the failure detection unit 123, the port number "10100" is attached to the recovery notification as the identification information.

The second transmission and reception unit 126 transmits the main signal and the control information flowing within the communication network to outside of the communication network and receives the main signal and the control information from outside of the communication network. That is, the second transmission and reception unit 126 is an interface for communications with the outside of the communication network. For this reason, the EMS server 300 is connected to the second transmission and reception unit 126 via the Open-Flow switches 210 to 260. In a case where the primary alarm is received from the first transmission and reception unit 121 and also the secondary alarm is received from the alarm notification unit 125, the second transmission and reception unit 126 transmits both the primary alarm and the secondary alarm towards the EMS server 300.

Subsequently, a configuration of the EMS server 300 will be described with reference to FIG. 4 and FIGS. 5A to 5C.

Figure 4:
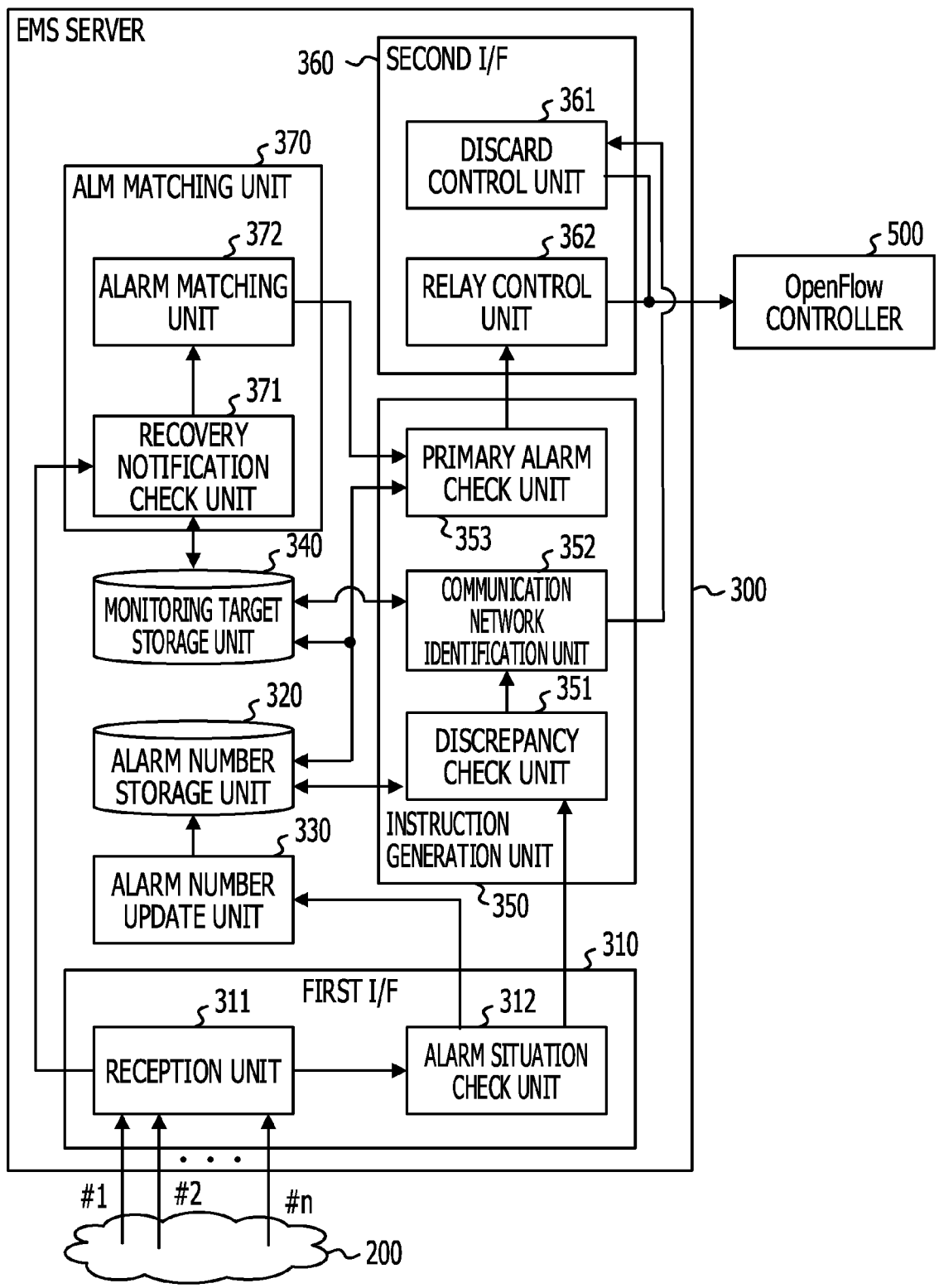
FIG. 4 is an exemplary block diagram of an EMS server.

FIG. 4 is an exemplary block diagram of the EMS server 300. FIG. 5A illustrates an example of an alarm number management table. FIG. 5B illustrates an example of a monitoring target network table. FIG. 5C illustrates an example of a monitoring target NE table.

As illustrated in FIG. 4, the EMS server 300 includes a first interface (I/F) 310, an alarm number storage unit 320, an alarm number update unit 330, a monitoring target storage unit 340, an instruction generation unit 350, a second I/F 360, and an ALM matching unit 370.

The first I/F 310 is an interface for communications with the DCN 200. The first I/F 310 includes a reception unit 311 and an alarm situation check unit 312.

The reception unit 311 is configured to receive an alarm that has been notified upon detection of the failure by the NEs 110 and 120 and that includes identification information in accordance with the type of the alarm. The alarm includes, for example, the primary alarm and the secondary alarm described above. The identification information includes, for example, the port numbers described above. The reception unit 311 also receives a recovery notification that has been notified upon detection of restoration from the failure by the NEs 110 and 120. When it is determined that the recovery notification is received on the basis of the port number, the reception unit 311 notifies a recovery notification check unit 371 which will be described below of reception of the recovery notification.

In a case where an alarm is received by the reception unit 311, the alarm situation check unit 312 checks a development situation for each type of the alarms on the basis of the identification information. Specifically, the alarm situation check unit 312 counts the number of alarms received per unit time by the reception unit 311 for each type of the alarms. The counted number of alarms is transmitted to the alarm number update unit 330. If it is determined, on the basis of the checked development situation of alarms for the respective types, that a particular alarm notified from communication apparatuses other than the communication apparatus adjacent to the failure development location has repeatedly developed, the alarm situation check unit 312 notifies the instruction generation unit 350 that will be described below that the particular alarm has repeatedly developed. Specifically, in a case where the number of alarms including particular identification information among the counted alarm number is higher than a predetermined alarm number, the alarm situation check unit 312 notifies a discrepancy check unit 351 that will be described below that the alarm number is in excess. The particular identification information includes, for example, the port number "10100". Therefore, it is determined that the alarm including the port number "10100" is the secondary alarm. The predetermined alarm number, the particular identification information, and the unit time are a number, information, and a time that are arbitrarily determined by an administrator that manages the monitoring system S or the EMS server 300. These number, information, and time are determined, for example, on the basis of a network scale. The network scale is determined, for example, on the basis of the number of NEs.

The alarm number storage unit 320 stores the alarm number for each network by way of the alarm number management table. As illustrated in FIG. 5A, the alarm number management table includes items of a network identifier (ID), the primary alarm number, the secondary alarm number, the previous secondary alarm number, and a discrepancy. For example, it may be understood on the basis of a network ID "0002" corresponding to the identification information indicating the network #2, that the primary alarm number "1" and the secondary alarm number "59" per unit time are notified from the network #2. With regard to the secondary alarm number, the previous secondary alarm number "6" is also stored. A discrepancy (difference) between the current secondary alarm number "59" and the previous secondary alarm number "6" is a difference value "53". The difference value indicates the increased amount of the secondary alarm per unit time.

The alarm number update unit 330 updates the alarm number of the alarm number management table stored in the alarm number storage unit 320 on the basis of the number of alarms counted by the alarm situation check unit 312. The update is carried out for every unit time. When the update is carried out, the current secondary alarm number is shifted to the previous secondary alarm number. Then, the primary alarm number and the secondary alarm number are respectively updated to the current primary alarm number and the current secondary alarm number. The difference value is also calculated and updated for each network.

The monitoring target storage unit 340 stores therein the monitoring target network table and the monitoring target NE table. As illustrated in FIG. 5B, the monitoring target network table includes items of an NE ID, the network ID, and a network name. The NE ID is identification information for identifying the NEs 110 and 120. The network ID is the identification information for identifying the communication networks #1 to #n. The network name is a name assigned to the network ID. According to the monitoring target network table illustrated in FIG. 5B, it may be determined that NEs with NE IDs "T001" to "T004" are included in the network #2 having a network name "Tokyo". On the other hand, as illustrated in FIG. 5C, the monitoring target NE table includes items of a management ID, an NE name, and an address. The management ID is identification information for identifying an NE managed by the EMS server 300. The NE name is a name assigned to the NE. The address is an address of the NE. According to the monitoring target NE table illustrated in FIG. 5C, for example, an address of an NE with the management ID "T001" having the NE name "Tokyo GNE 1" may be grasped. The monitoring target storage unit 340 also includes a developing alarm table including items of the NE ID, a name of the alarm, an importance of the alarm (for example, high, intermediate, or low), and a development time of the alarm. The developing alarm table includes the name of the alarm and the like for each NE ID.

The instruction generation unit 350 generates an execution instruction for executing a particular control and a cancel instruction for cancelling the particular control which are transmitted to the OpenFlow controller 500. An operation by the OpenFlow controller 500 existing outside the EMS server 300 is controlled on the basis of the generated execution instruction and the cancel instruction. The instruction generation unit 350 includes the discrepancy check unit 351, a communication network identification unit 352, and a primary alarm check unit 353.

When it is notified from the alarm situation check unit 312 that a particular alarm has repeatedly developed, the discrepancy check unit 351 checks a discrepancy between the development situation of the particular alarm checked by the alarm situation check unit 312 and the previous development situation of the particular alarm. Specifically, when it is notified from the alarm situation check unit 312 that the alarm number is in excess, the discrepancy check unit 351 checks a difference value between the number of alarms counted by the alarm situation check unit 312 and the previous number of alarms for each communication network. The check is conducted while the discrepancy check unit 351 refers to the discrepancy of the alarm number management table stored in the alarm number storage unit 320. The discrepancy check unit 351 transmits the checked difference value to the communication network identification unit 352.

In a case where the difference value transmitted from the discrepancy check unit 351 exceeds a predetermined value, the communication network identification unit 352 identifies the communication network serving as a cause of the difference value. That is, the communication network is identified in a case where the abrupt increase occurs. The identification is conducted by referring to the alarm number storage unit 320. For example, in a case where a predetermined threshold is a threshold "50", it may be determined that the communication network serving as a cause of the excess over the threshold "50" is the network with the network ID "0002" by referencing the alarm number management table illustrated in FIG. 5A. Therefore, the communication network #2 is identified. The predetermined value is a value arbitrarily determined by an administrator that manages the monitoring system S or the EMS server 300. This value may also be determined in accordance with the network scale based on the number of NEs. When the communication network is identified, the communication network identification unit 352 refers to the monitoring target storage unit 340 and obtains information regarding NEs included in the identified communication network. For example, when the communication network #2 is identified, all the NE IDs associated with the network ID "0002" illustrated in FIG. 5B are obtained. Furthermore, the communication network identification unit 352 refers to the monitoring target storage unit 340 and obtains addresses corresponding to the obtained NE IDs. After the NE IDs and the addresses are obtained, the communication network identification unit 352 generates an execution instruction for carrying out particular control. This execution instruction is an instruction of causing the OpenFlow controller 500 to perform a control so that the OpenFlow switches 210 and 220 that are connected to the NEs 120 included in the identified communication network discard the alarm including the particular identification information (for example, the port number "10100"). The communication network identification unit 352 adds on the obtained NE IDs and addresses in this execution instruction and transmits the execution instruction to a discard control unit 361.

In a case where a matching completion notification is notified from an alarm matching unit 372 which will be described below, the primary alarm check unit 353 refers to the alarm number storage unit 320 and checks whether or not a primary alarm has developed in the target network to be controlled. When it is determined that no primary alarm has developed in the target network, the primary alarm check unit 353 refers to the monitoring target NE table of the monitoring target storage unit 340 and obtains a management ID on the basis of a notification source address included in the recovery notification. The primary alarm check unit 353 refers to the monitoring target network table of the monitoring target storage unit 340 and obtains a network ID on the basis of the obtained management ID, and also obtains all the NE IDs of NEs included in a network with the network ID. Furthermore, the primary alarm check unit 353 refers to the monitoring target NE table of the monitoring target storage unit 340 and obtains addresses on the basis of the obtained NE IDs. After the NE IDs and the addresses are obtained, the primary alarm check unit 353 generates a cancel instruction for canceling the particular control. This cancel instruction is an instruction for causing the OpenFlow controller 500 to cancel the control where the OpenFlow switches 210 and 220 connected to the NEs 120 included in the communication network to be controlled discard the alarm including the particular identification information (for example, the port number "10100"). The primary alarm check unit 353 adds on the obtained NE IDs and addresses to the generated cancel instruction and transmits the cancel instruction to a relay control unit 362.

The second I/F 360 is an interface for communications with the OpenFlow controller 500. The second I/F 360 includes the discard control unit 361 and the relay control unit 362.

The discard control unit 361 causes at least one of the plural OpenFlow switches 210 to 260 that relay an alarm notified from each of the plural NEs 110 and 120 to the reception unit 311, to discard a particular alarm in units of the identification information through the OpenFlow controller 500 that controls the plural OpenFlow switches 210 to 260. Specifically, the discard control unit 361 transmits the execution instruction that has been transmitted from the communication network identification unit 352, to the OpenFlow controller 500.

In a case where the alarm matching is completed by the alarm matching unit 372, the relay control unit 362 causes the OpenFlow switch that discards the particular alarm to relay the particular alarm through the OpenFlow controller 500. Specifically, the relay control unit 362 transmits the cancel instruction that has been transmitted from the primary alarm check unit 353, to the OpenFlow controller 500.

The ALM matching unit 370 is configured to execute alarm matching processing. The ALM matching unit 370 includes the recovery notification check unit 371 and the alarm matching unit 372.

When the recovery notification check unit 371 is notified from the reception unit 311 that a recovery notification has been notified, the recovery notification check unit 371 checks whether or not the recovery notification is a recovery notification notified from the communication network that is identified by the communication network identification unit 352. The check is conducted while the recovery notification check unit 371 refers to the monitoring target storage unit 340 on the basis of the notification source address included in the recovery notification. When it is checked that notification is the recovery notification notified from the communication network identified by the communication network identification unit 352, the recovery notification check unit 371 transmits the network ID of the identified communication network to the alarm matching unit 372.

When the network ID is received from the recovery notification check unit 371, the alarm matching unit 372 executes processing of matching the alarms (including the discarded alarms) transmitted from all the NEs 110 and 120 included in the identified communication network with the alarms of the alarm number storage unit 320 after a predetermined period of time elapses. This causes the traffic control to return to a state before the control of discarding the alarms including the particular identification information is executed. When the alarm matching processing is completed, the alarm matching unit 372 notifies the primary alarm check unit 353 of a matching completion notification. The predetermined period of time may also be determined on the basis of the network scale as described above.

Subsequently, the above-mentioned HMI terminal 400 will be described.

The HMI terminal 400 is connected to the EMS server 300 (see FIG. 1). The HMI terminal 400 includes an input apparatus 410 and a display apparatus 420 which will be described below. The above-mentioned development of the failure and restoration from the failure as well as these contents are displayed on the display apparatus 420 via the EMS server 300. In addition, a display of alarm numbers for each type of alarms, a display of alarms in a list form, a display of a network topology map, a display on a management screen (BayFace) for each of the NEs 110 and 120 may also be performed. The HMI terminal 400 is operated, for example, by the administrator through the input apparatus 410. The administrator utilizes the HMI terminal 400 to manage various states in the communication network including the failure of NEs and restoration therefrom.

Subsequently, a configuration of the OpenFlow controller 500 described above will be described with reference to FIG. 6 and FIGS. 7A and 7B.

Figure 6:
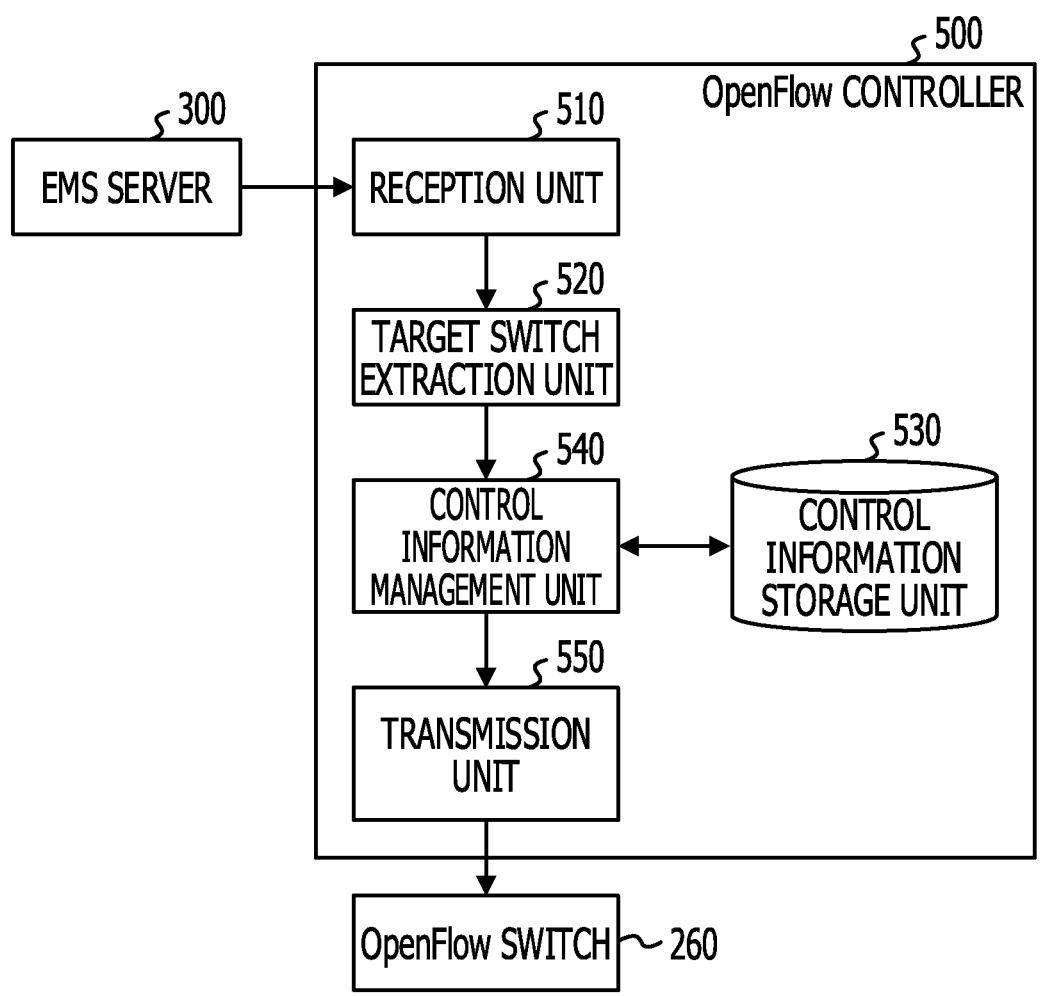
FIG. 6 is an exemplary block diagram of an OpenFlow controller.

FIG. 6 is an exemplary block diagram of the OpenFlow controller 500. FIG. 7A illustrates an example of a control table. FIG. 7B illustrates another example of the control table.

The OpenFlow controller 500 collectively manages a security policy and a configuration of the DCN 200 including the OpenFlow switches 210 to 260. The OpenFlow controller 500 collectively changes, for example, the settings of the OpenFlow switches 210 to 260. The OpenFlow controller 500 includes a reception unit 510, a target switch extraction unit 520, a control information storage unit 530, a control information management unit 540, and a transmission unit 550.

The reception unit 510 receives an execution instruction or a cancel instruction from the EMS server 300. The reception unit 510 transmits the received execution instruction or the received cancel instruction to the target switch extraction unit 520.

The target switch extraction unit 520 extracts a target OpenFlow switch from the execution instruction or the cancel instruction transmitted from the reception unit 510. The execution instruction or the cancel instruction includes the NE IDs and the addresses as described above. The target switch extraction unit 520 extracts the target OpenFlow switch on the basis of the NE IDs and the addresses. Since the OpenFlow controller 500 manages all the OpenFlow switches 210 to 260, the target switch extraction unit 520 extracts the OpenFlow switches connected to NEs with the NE IDs and the addresses from the OpenFlow switches 210 to 260. According to this, for example, the OpenFlow switches 210 and 220 connected to the respective NEs 120 included in the communication network #2 are extracted.

The control information storage unit 530 stores the control table that controls communications between the OpenFlow switches 210 to 250. The control table is also referred to, for example, as control information, path information, or routing information. As illustrated in FIG. 7A and FIG. 7B, the control table includes items of a port number, a target network, and a control content. For example, in FIG. 7A, the target network "all" and the control content "transfer to the EMS server" are stored for all the port numbers "10000" to "10400". For this reason, the primary alarm, the secondary alarm, the switching notification, and the like corresponding to the respective port numbers are transferred to the EMS server 300 in any network. The target network and the control content are appropriately altered by the control information management unit 540 which will be described above.

The control information management unit 540 manages the control table stored in the control information storage unit 530. In a case where an execution instruction is received, the control information management unit 540 alters the control table so that the primary alarm and the recovery notification are transferred to the EMS server 300. For this reason, the control table illustrated in FIG. 7A is altered into the control table illustrated in FIG. 7B. When the control table is altered, as illustrated in FIG. 7B, the primary alarm or the recovery notification corresponding to the port number "10000" is transferred to the EMS server 300 in any network. In the network with the network ID "0002", for example, the secondary alarm or the recovery notification corresponding to the port number "10100" is discarded. On the other hand, in a case where a cancel instruction is received, the control information management unit 540 alters the control table so that all pieces of information are transferred to the EMS server 300. For this reason, the control table illustrated in FIG. 7B is altered into the control table illustrated in FIG. 7A.

When it is determined that an execution instruction is received, the transmission unit 550 transmits a control table for causing OpenFlow switch extracted by the target switch extraction unit 520 to discard the alarm including the particular identification information to the relevant OpenFlow switch. When it is determined that a cancel instruction is received, the transmission unit 550 transmits a control table for causing the OpenFlow switch extracted by the target switch extraction unit 520 to cancel the discard of the alarm including the particular identification information to the relevant OpenFlow switch. The transmission unit 550 obtains the control table from the control information storage unit 530 to be collectively transmitted. As a result, the target OpenFlow switch to be controlled only transfers information used by the EMS server 300. When the control is cancelled, the OpenFlow switch that has been the control target returns to the state before the control and transfers all pieces of information to the EMS server 300.

Here, a hardware configuration of the EMS server 300 will be described with reference to FIG. 8.

Figure 8:
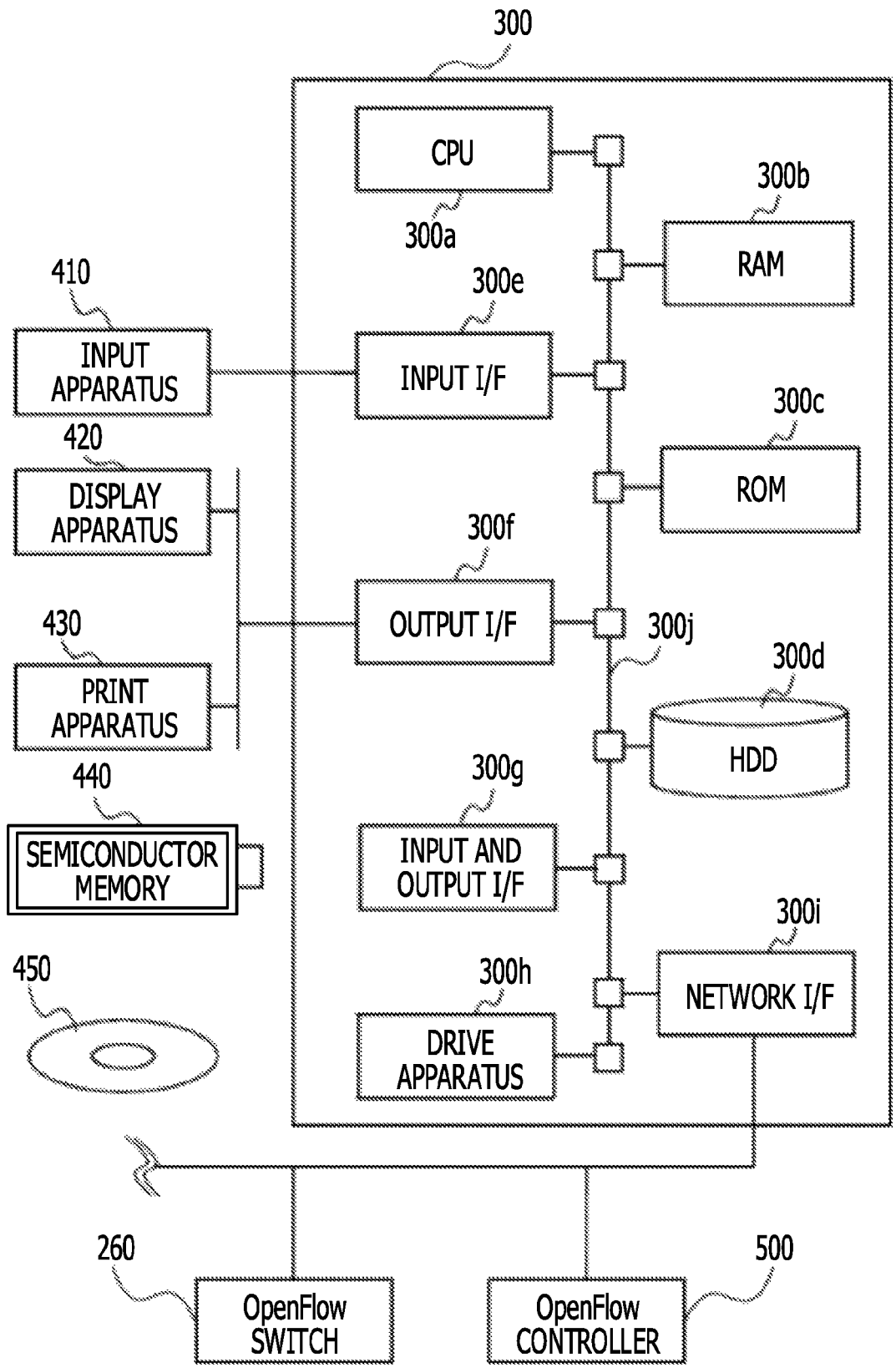
FIG. 8 illustrates an exemplary hardware configuration of an EMS server.

FIG. 8 illustrates an exemplary hardware configuration of the EMS server 300.

The EMS server 300 includes a central processing unit (CPU) 300a, a random access memory (RAM) 300b, a read only memory (ROM) 300c, and a hard disc drive (HDD) 300d. The EMS server 300 also includes an input interface (I/F) 300e, an output I/F 300f, and an input and output I/F 300g. The EMS server 300 also includes a drive apparatus 300h and a network I/F 300i. These respective apparatuses 300a to 300i are connected to each other by a bus 300j. At least the CPU 300a and the RAM 300b operate in cooperation with each other, so that a computer is realized.

The input apparatus 410 is connected to the input I/F 300e. The input apparatus includes, for example, a key board, a mouse, and the like.

Output apparatuses are connected to the output I/F 300f. The output apparatuses include, for example, the display apparatus 420 (for example, a liquid crystal display) and a print apparatus 430 (for example, a printer).

A semiconductor memory 440 is connected to the input and output I/F 300g. The semiconductor memory 440 includes, for example, a Universal Serial Bus (USB) memory, a flash memory, and the like. The input and output I/F 300g is configured to read a program or data stored in the semiconductor memory 440.

The input I/F 300e, the output I/F 300f, and the input and output I/F 300g include, for example, a USB port.

A portable recording medium 450 is inserted to the drive apparatus 300h. The portable recording medium 450 includes, for example, a removable disc such as a compact disc (CD)-ROM or a digital versatile disc (DVD). The drive apparatus 300h is configured to read a program or data stored in the portable recording medium 450.

One terminal of a local area network (LAN) cable is connected to the network I/F 300i, for example. The other terminal of the LAN cable is connected to the OpenFlow switch 260 and the OpenFlow controller 500. The network I/F 300i includes, for example, a LAN port. A wireless LAN may be utilized instead of the LAN cable.

An alarm management program stored in the ROM 300c, the HDD 300d, or a semiconductor memory 150 is loaded into the RAM 300b described above. Alternatively, the alarm management program may be recorded in a portable recording medium 450 and loaded into the RAM 300b from the portable recording medium 450. The respective functions of the functional units 311, 312, . . . , and 372 of the EMS server 300 except for the alarm number storage unit 320 and the monitoring target storage unit 340 are realized while the loaded alarm management program is executed by the CPU 300a. The EMS server 300 executes respective processes of a method for managing alarms. The alarm management program corresponds to flow charts which will be described below.

The hardware configurations of the NEs 110 and 120 and the OpenFlow controller 500 are basically similar to the hardware configuration of the EMS server 300. Respective processes of a communication method which will be described below are executed by the NEs 110 and 120. Respective processes of a method for controlling alarms which will be described below are executed by the OpenFlow controller 500. A communication program and an alarm control program correspond to flow charts which will be described below.

Next, an operation by the monitoring system S before the control table transmission in a case where a failure has developed will be described.

Figure 9:
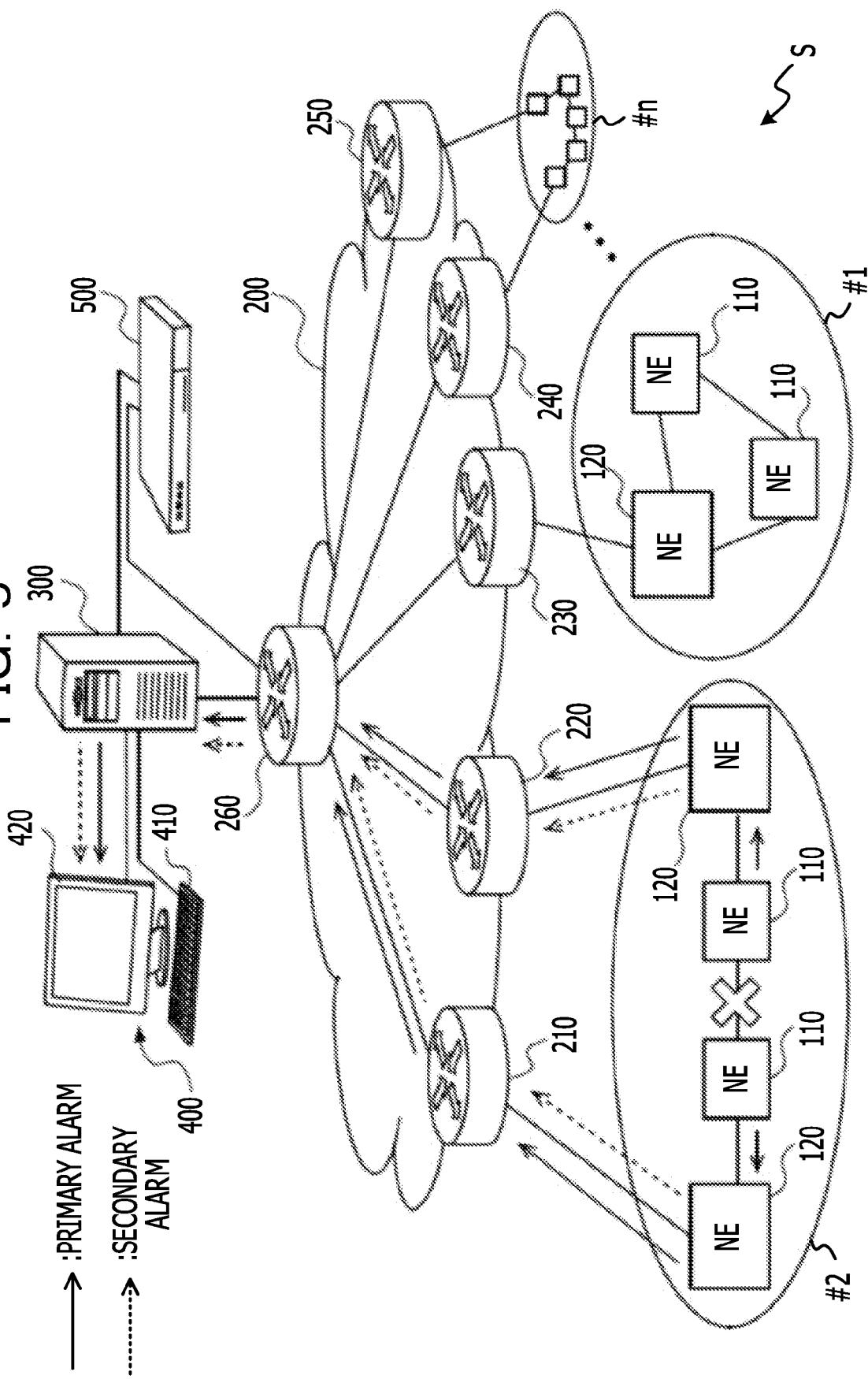
FIG. 9 illustrates an operation by a monitoring system according to an embodiment.

FIG. 9 illustrates an operation by the monitoring system S according to the embodiment. As illustrated in FIG. 9, for example, when the optical fiber that connects the NEs 110 to each other is disconnected in the communication network #2, both the NEs 110 adjacent to the disconnection location detect the LOS. As a result, the NEs 110 first transmit the primary alarm to the NEs 120 connected to the respective NEs 110. The NEs 120 detect the AIS or the RDI when the primary alarm is received from the respective NEs 110. As a result, the NEs 120 transmit the secondary alarm as well as the received primary alarm to the OpenFlow switches 210 and 220, respectively.

The OpenFlow switches 210 and 220 transmit the received primary alarm and the secondary alarm to the OpenFlow switch 260. That is, the OpenFlow switches 210 and 220 relays or transfers the primary alarm and the secondary alarm to the OpenFlow switch 260. The OpenFlow switch 260 transmits the received primary alarm and the received secondary alarm to the EMS server 300. As a result, the primary alarm and the secondary alarm are displayed on the HMI terminal 400.

Next, an operation by the monitoring system S after the control table transmission in a case where a failure has developed will be described.

Figure 10:
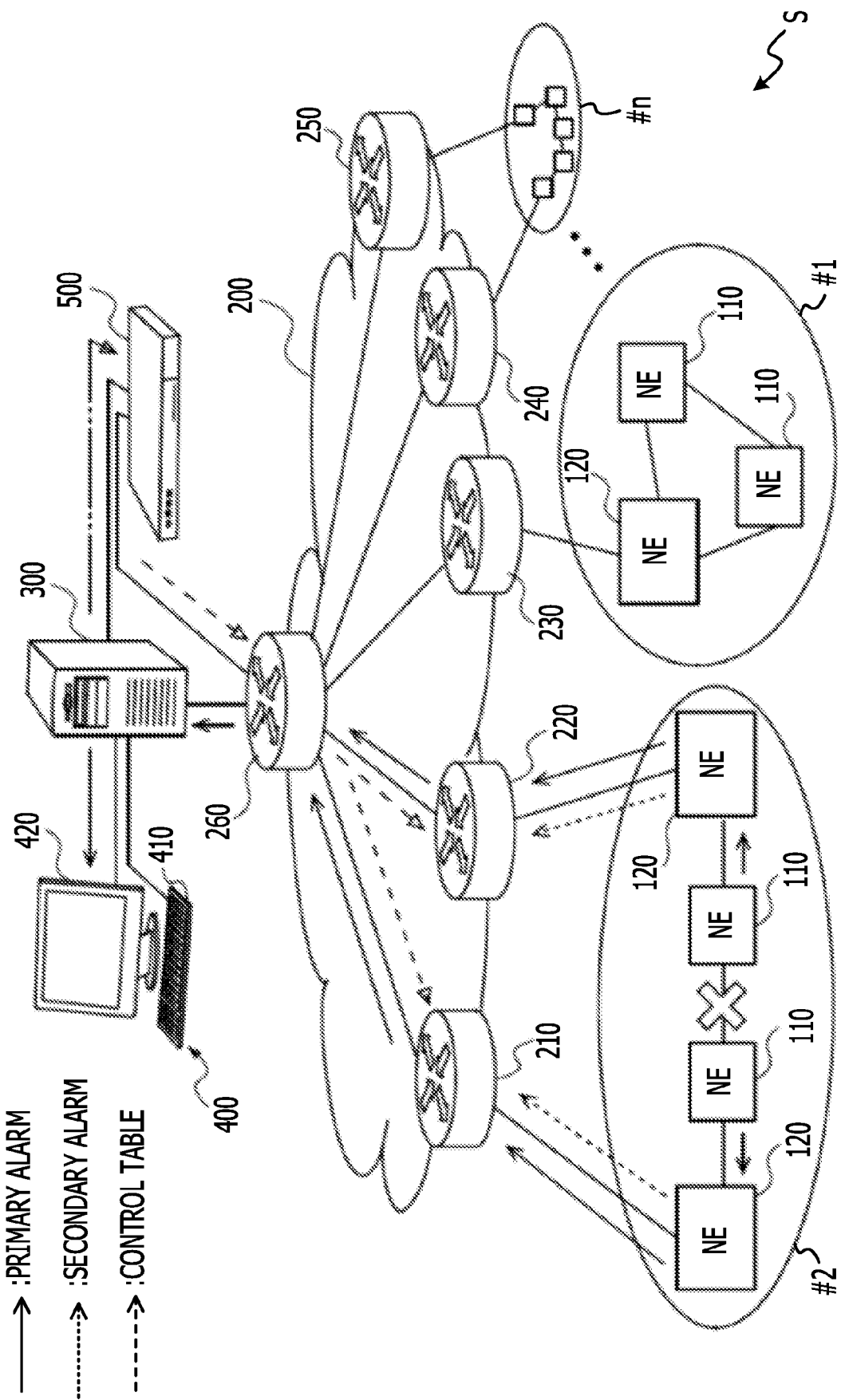
FIG. 10 illustrates an operation by a monitoring system according to an embodiment.

FIG. 10 illustrates an operation by the monitoring system S according to the embodiment. As described above, in a case where the EMS server 300 determines that a difference value between the alarm number of the secondary alarms and the previous alarm number exceeds a predetermined value, the OpenFlow controller 500 transmits the control table to the OpenFlow switches 210 and 220 via the OpenFlow switch 260. As a result, the secondary alarms transmitted from the respective NEs 120 in the communication network #2 are discarded by the OpenFlow switches 210 and 220. Therefore, the flow of the secondary alarms into the DCN 200 is avoided. For this reason, a congestion in the DCN 200 is suppressed.

As illustrated in FIG. 10, the EMS server 300 is notified of the primary alarm in principle with the exception of the recovery notification. As a result, the secondary alarm is not displayed on the HMI terminal 400, and the primary alarm is displayed thereon. For this reason, it is possible to promptly identify the failure location.

Next, the respective operations by the NEs 110 and 120, the EMS server 300, and the OpenFlow controller 500 at the time of a failure development will be described.

First, a communication method executed by the NEs 110 and 120 at the time of failure development will be described with reference to FIG. 11.

Figure 11:
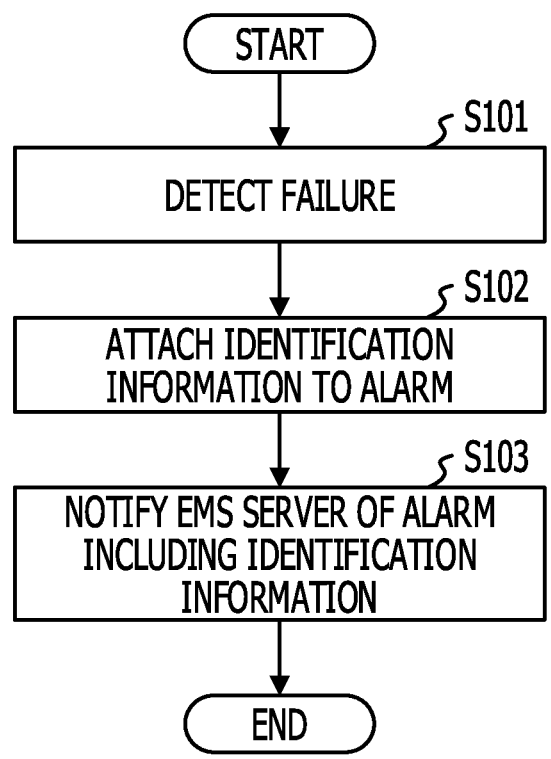
FIG. 11 is a flow chart for exemplifying a process flow of a communication method executed by an NE at the time of a failure development.

FIG. 11 is a flow chart for exemplifying a process flow of a communication method executed by the NEs 110 and 120 at the time of failure development.

As illustrated in FIG. 11, when the failure detection unit 113 or 123 detects a failure (S101), the alarm notification unit 115 or 125 attaches, to an alarm, identification information in accordance with a type of the alarm (S102). As a result, for example, when the alarm is the LOS, the port number "10000" is attached to the alarm. For example, when the alarm is the AIS or the RDI, the port number "10100" is attached to the alarm. When the identification information is attached to the alarm, the alarm notification unit 115 or 125 notifies the EMS server 300 of the alarm including the identification information (S103).

Next, a method for managing alarms executed by the EMS server 300 at the time of failure development will be described with reference to FIGS. 12A and 12B.

FIG. 12A is a flow chart for exemplifying a process flow of a method for managing alarms executed by the first I/F 310 at the time of failure development. FIG. 12B is a flow chart for exemplifying a process flow of a method for managing alarms executed by the instruction generation unit 350 at the time of failure development.

As illustrated in FIG. 12A, when the reception unit 311 receives the alarm (S301), the alarm situation check unit 312 checks a development situation of the alarm (S302). Specifically, the alarm number per unit time is counted for each type of the alarms. Subsequently, the alarm situation check unit 312 determines whether or not a particular alarm has repeatedly developed (S303). Specifically, it is determined whether the number of the alarms including the particular identification information (for example, the port number "10100") is higher than a predetermined alarm number, among the counted alarm number. In a case where it is determined that the particular alarm has repeatedly developed (S303: YES), the alarm situation check unit 312 notifies the instruction generation unit 350 of the repetitive developments of alarm (S304), and the flow returns to S302. That is, when it is determined that the number of the alarms including the particular identification information is higher than the predetermined alarm number, the instruction generation unit 350 is notified that the alarm number is in excess, and the flow returns to S302. When it is determined that the particular alarm has not repetitively developed (S303: NO), the flow also returns to S302.

Subsequently, as illustrated in FIG. 12B, the discrepancy check unit 351 included in the instruction generation unit 350 receives the notification of the repetitive developments of alarm from the first I/F 310 (S311). That is, an effect that the alarm number is in excess is received. After the reception, the discrepancy check unit 351 checks a discrepancy in the alarm number management table (S312). Here, the discrepancy check unit 351 determines whether or not a communication network having significant discrepancy exists (S313). Specifically, it is determined whether or not a communication network where the difference value exceeds a predetermined value exists.

In a case where the discrepancy check unit 351 determines that a communication network having significant discrepancy exists (S313: YES), the communication network identification unit 352 identifies the communication network having significant discrepancy (S314). Specifically, in a case where the discrepancy check unit 351 determines that a communication network where the difference value exceeds the predetermined value exists, the communication network identification unit 352 identifies the communication network having the difference value. Subsequently, the communication network identification unit 352 generates an execution instruction for executing a control of discarding the secondary alarm and transmits the execution instruction to the discard control unit 361 (S315). The execution instruction is transmitted to the OpenFlow controller 500 by the discard control unit 361. At this time, the communication network identification unit 352 adds on the NE IDs and the addresses obtained from the monitoring target storage unit 340 to the execution instruction to be transmitted. On the other hand, in a case where the discrepancy check unit 351 determines that no communication network having the significant discrepancy exists (S313: NO), that is, when it is not determined that a communication network where the difference value exceeds the predetermined value exists, the process ends.

Finally, a method for controlling alarms executed by the OpenFlow controller 500 at the time of failure development will be described with reference to FIG. 13.

Figure 13:
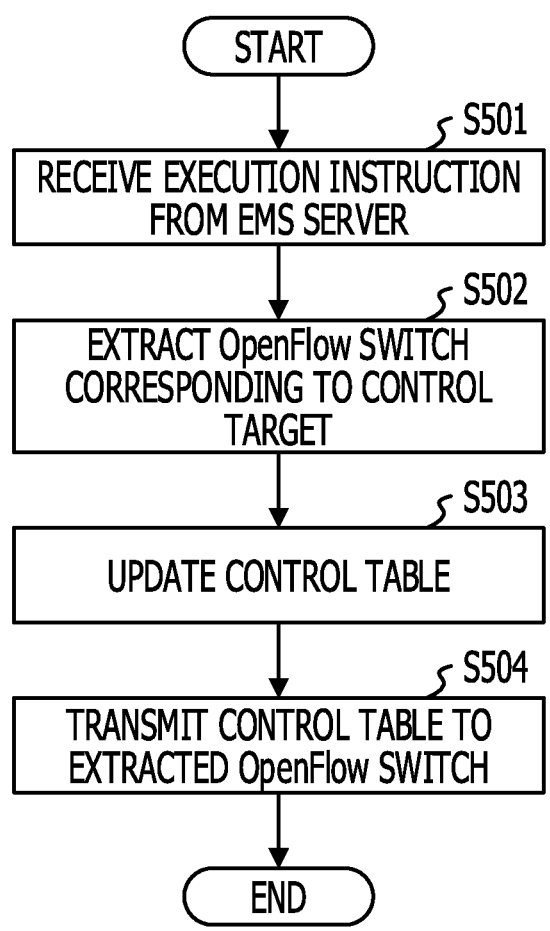
FIG. 13 is a flow chart for exemplifying a process flow of a method for controlling alarms executed by an OpenFlow controller at the time of a failure development.

FIG. 13 is a flow chart for exemplifying a process flow of a method for controlling alarms by the OpenFlow controller 500 at the time of failure development.

First, when the reception unit 510 receives an execution instruction from the EMS server 300 (S501), the target switch extraction unit 520 extracts target OpenFlow switches to be controlled on the basis of the NE IDs and the addresses included in the execution instruction (S502). According to the present embodiment, the OpenFlow switches 210 and 220 are extracted. Subsequently, the control information management unit 540 updates the control table (S503). As a result, the control table is altered from the control table for allowing the secondary alarms to be passed to the control table for inhibiting the secondary alarms from being passed and for discarding the secondary alarms. Subsequently, the transmission unit 550 transmits the updated control table to the extracted OpenFlow switches (S504). As a result, the OpenFlow switches 210 and 220 to which the control table has been transmitted discard the secondary alarms.

Subsequently, respective operations by the NEs 110 and 120, the EMS server 300, and the OpenFlow controller 500 at the time of restoration from the failure will be described.

First, a communication method executed by the NEs 110 and 120 at the time of restoration from the failure will be described with reference to FIG. 14.

Figure 14:
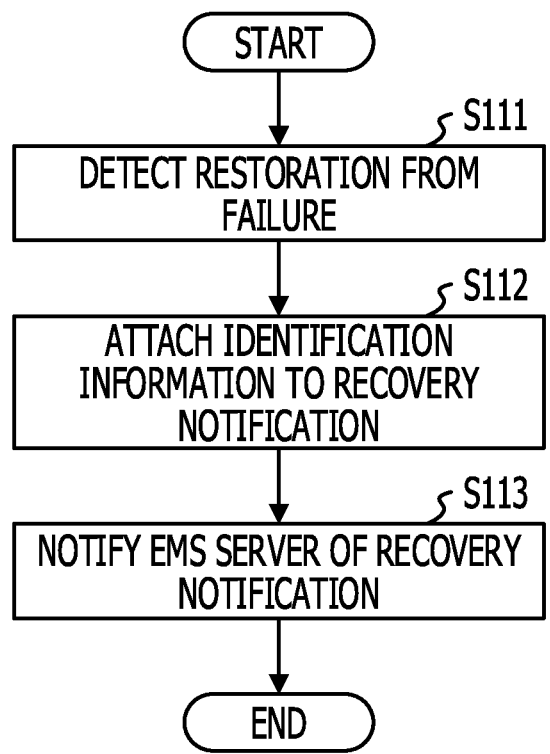
FIG. 14 is a flow chart for exemplifying a process flow of a communication method executed by an NE at the time of restoration from a failure.

FIG. 14 is a flow chart for exemplifying a process flow of a communication method executed by the NEs 110 and 120 at the time of restoration from the failure.

As illustrated in FIG. 14, when the failure detection unit 113 or 123 detects restoration from the failure (S111), the alarm notification unit 115 or 125 attaches the identification information in accordance with the restoration from the failure to the recovery notification (S112). As a result, for example, the alarm notification unit 115 attaches the port number "10000" to the recovery notification (first recovery notification). For example, the alarm notification unit 125 attaches the port number "10100" to the recovery notification (second recovery notification). When the identification information is attached to the recovery notification, the alarm notification unit 115 or 125 notifies the EMS server 300 of the recovery notification including the identification information (S113).

Next, a method for managing alarms executed by the EMS server 300 at the time of restoration from the failure will be described with reference to FIGS. 15A and 15B.

Figure 15A:
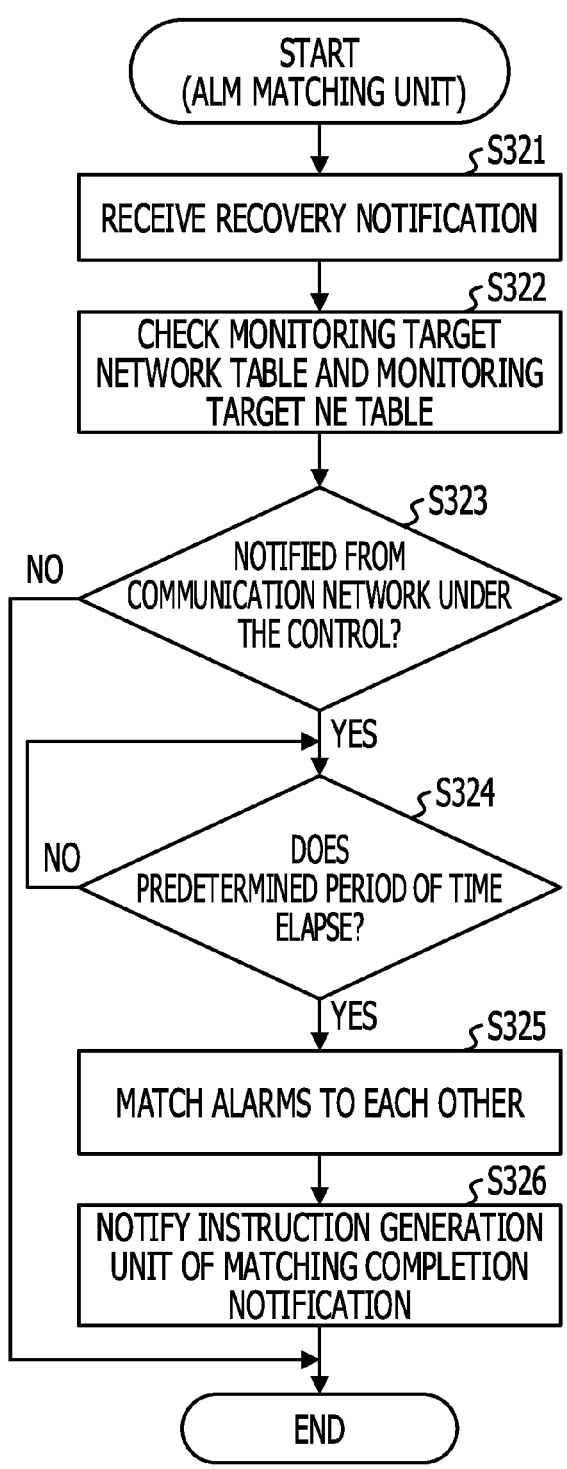
FIG. 15A is a flow chart for exemplifying a process flow of a method for managing alarms executed by an ALM matching unit at the time of restoration from a failure.

FIG. 15A is a flow chart for exemplifying a process flow of a method for managing alarms executed by the ALM matching unit 370 at the time of restoration from the failure. FIG. 15B is a flow chart for exemplifying a process flow of a method for managing alarms executed by the instruction generation unit 350 at the time of restoration from the failure.

As illustrated in FIG. 15A, when the reception unit 311 receives a recovery notification (first recovery notification) (S321), the recovery notification check unit 371 checks the monitoring target storage unit 340 (S322). Since a second recovery notification is discarded by the OpenFlow switches 210 and 220, the second recovery notification is not received. Here, the recovery notification check unit 371 determines whether or not the notification is the recovery notification notified from the communication network under the control (S323). This determination is conducted on the basis of the monitoring target network table and the monitoring target NE table stored in the monitoring target storage unit 340.

In a case where the recovery notification check unit 371 determines that the notification is the recovery notification notified from the communication network under the control (S323: YES), the alarm matching unit 372 determines whether or not a predetermined period of time elapses (S324). Whether the predetermined period of time elapses or not may be determined after the recovery notification has been notified or may be determined after the recovery notification has been received. When it is determined that the predetermined period of time elapses (S324: YES), the alarm matching unit 372 matches the alarms to each other (S325). As a result, the alarms of all the NEs 110 and 120 included in the communication network under the control and the alarms of the alarm number storage unit 320 are matched to each other. When the alarm matching processing is completed, the alarm matching unit 372 notifies the instruction generation unit 350 of a matching completion notification (S326).

Figure 15B:
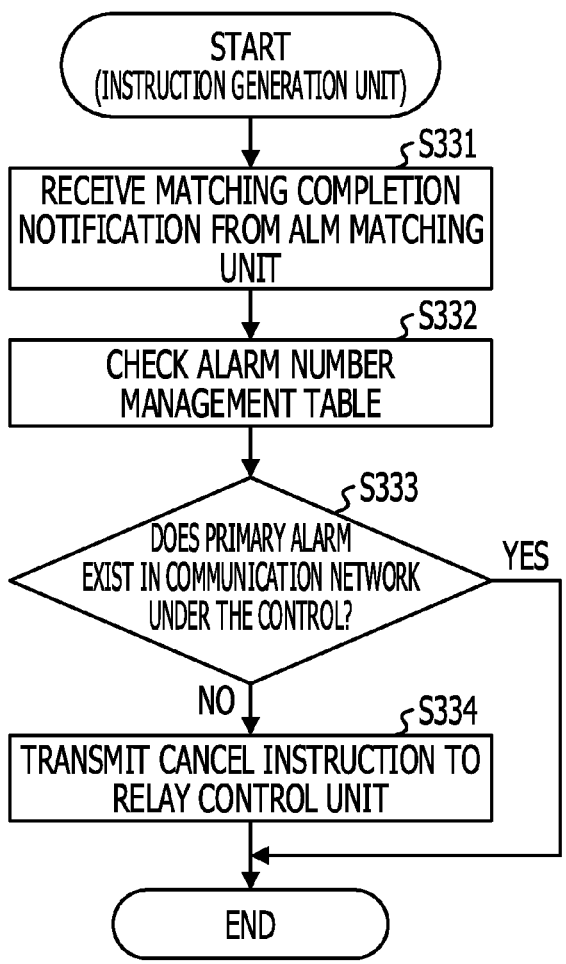
FIG. 15B is a flow chart for exemplifying a process flow of a method for managing alarms executed by an instruction generation unit at the time of restoration from a failure.

Subsequently, as illustrated in FIG. 15B, when a matching completion notification is received from the ALM matching unit 370 (S331), the primary alarm check unit 353 of the instruction generation unit 350 checks the alarm number management table (S332). Here, the primary alarm check unit 353 determines whether or not the primary alarm exists in the communication network under the control (S333). When it is determined that the primary alarm does not exist in the communication network under the control (S333: NO), the primary alarm check unit 353 transmits a cancel instruction for cancelling the control of discarding the secondary alarm to the relay control unit 362 (S334). The cancel instruction is transmitted to the OpenFlow controller 500 by the relay control unit 362.

Finally, a method for controlling alarms executed by the OpenFlow controller 500 at the time of restoration from the failure will be described with reference to FIG. 16.

Figure 16:
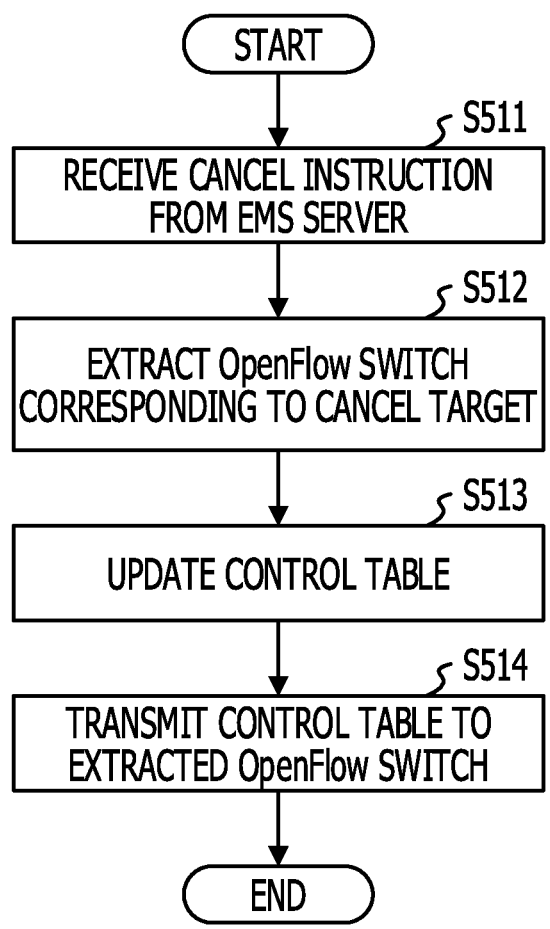
FIG. 16 is a flow chart for exemplifying a process flow of a method for controlling alarms executed by an OpenFlow controller at the time of restoration from a failure.

FIG. 16 is a flow chart for exemplifying a process flow of a method for controlling alarms executed by the OpenFlow controller 500 at the time of restoration from the failure.

First, when the reception unit 510 receives a cancel instruction from the EMS server 300 (S511), the target switch extraction unit 520 extracts the OpenFlow switches corresponding to the cancel targets on the basis of the NE IDs and the addresses included in the cancel instruction (S512). According to the present embodiment, the OpenFlow switches 210 and 220 are extracted. Subsequently, the control information management unit 540 updates the control table (S513). As a result, the control table is updated from the control table for inhibiting the secondary alarm from being passed and for discarding the secondary alarms to the control table for allowing the secondary alarms to be passed. Subsequently, the transmission unit 550 transmits the updated control table to the extracted OpenFlow switches (S514). As a result, the OpenFlow switches to which the control information has been transmitted pass the secondary alarms again.

The control table may be transmitted to the OpenFlow switch 260 instead of the OpenFlow switches 210 and 220. As a result, the secondary alarm is discarded by the OpenFlow switch 260, and the primary alarm is displayed on the HMI terminal 400. It is however noted that the control table is desirably transmitted to the OpenFlow switches 210 and 220 from the viewpoint of the congestion suppression in the DCN 200.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An alarm management apparatus comprising:
a processor configured to
receive alarms notified upon a plurality of communication apparatuses detecting a failure, the alarms including identification information for identifying types of the respective alarms, each of the plurality of communication apparatuses being included in one of a plurality of communication networks,
check development situations of respective types of alarms received from each of the plurality of communication networks on basis of the identification information, determine a discrepancy between a current development situation of the alarms and a previous development situation of the alarms, and identify a particular communication network and a particular type of alarm, the particular communication network being identified when the discrepancy exceeds a predetermined value for the particular communication network, and
cause a first relay apparatus of a plurality of relay apparatuses to discard first alarms of the particular type, the first alarms of the particular type being notified from a first communication apparatus included in the particular communication network and that is not adjacent to a development location of the failure, the plurality of relay apparatuses being configured to relay alarms notified from the plurality of communication apparatuses to the alarm management apparatus.

2. The alarm management apparatus according to claim 1, wherein the first relay apparatus is connected to the first communication apparatus.

3. The alarm management apparatus according to claim 1, wherein the processor is configured to
count a number of the respective types of alarms per unit time to check the development situations, and
cause the first relay apparatus to discard the first alarms when the counted number of the first alarms is higher than a predetermined number.

4. The alarm management apparatus according to claim 1, wherein the processor is configured to
check, when a recovery notification notified upon a restoration from the failure is received, whether the recovery notification has been notified from any communication apparatus included in the particular communication network, and
perform, when it is determined that the recovery notification has been notified from any communication apparatus included in the particular communication network, alarm matching processing for matching the discarded first alarms to a development situation of the first alarms after a predetermined period of time elapses.

5. The alarm management apparatus according to claim 4, wherein the processor is configured to cause, when the alarm matching processing is completed, the first relay apparatus to relay the first alarms.

6. A method for managing alarms, the method comprising:
receiving, by a computer, alarms notified upon a plurality of communication apparatuses detecting a failure, the alarms including identification information for identifying types of the respective alarms, each of the plurality of communication apparatuses being included in one of a plurality of communication networks;
checking development situations for respective types of alarms received from each of the plurality of communication networks on basis of the identification information, determining a discrepancy between a current development situation of the alarms and a previous development situation of the alarms, and identifying a particular communication network and a particular type of alarm, the particular communication network being identified when the discrepancy exceeds a predetermined value for the particular communication network; and
causing a first relay apparatus of a plurality of relay apparatuses to discard first alarms of the particular type, the first alarms of the particular type being notified from a first communication apparatus included in the particular communication network and that is not adjacent to a development location of the failure, the plurality of relay apparatuses being configured to relay alarms notified from the plurality of communication apparatuses to the computer.

7. The method according to claim 6, wherein the first relay apparatus is connected to the first communication apparatus.

8. The method according to claim 6, wherein the computer
counts a number of the respective types of alarms per unit time to check the development situations, and
causes the first relay apparatus to discard the first alarms when the counted number of the first alarms is higher than a predetermined number.

9. The method according to claim 6, the method further comprising:
checking, when a recovery notification notified upon a restoration from the failure is received, whether the recovery notification has been notified from any communication apparatus included in the particular communication network; and
performing, when it is determined that the recovery notification has been notified from any communication apparatus included in the particular communication network, alarm matching processing for matching the discarded first alarms to a development situation of the first alarms after a predetermined period of time elapses.

10. The method according to claim 9, the method further comprising:
causing, when the alarm matching processing is completed, the first relay apparatus to relay the first alarms.

11. A non-transitory computer-readable recording medium having stored therein a program for causing a computer to execute a process, the process comprising:
receiving alarms notified upon a plurality of communication apparatuses detecting a failure, the alarms including identification information for identifying types of the respective alarms, each of the plurality of communication apparatuses being included in one of a plurality of communication networks;
checking development situations for respective types of alarms received from each of the plurality of communication networks on basis of the identification information, determining a discrepancy between a current development situation of the alarms and a previous development situation of the alarms, and identifying a particular communication network and a particular type of alarm, the particular communication network being identified when the discrepancy exceeds a predetermined value for the particular communication network; and causing a first relay apparatus of a plurality of relay apparatuses to discard first alarms of the particular type, the first alarms of the particular type being notified from a first communication apparatus included in the particular communication network and that is not adjacent to a development location of the failure, the plurality of relay apparatuses being configured to relay alarms notified from the plurality of communication apparatuses to the computer.

12. The non-transitory computer-readable recording medium according to claim 11, wherein the first relay apparatus is connected to the first communication apparatus.

13. The non-transitory computer-readable recording medium according to claim 11, wherein the computer
   counts a number of the respective types of alarms per unit time to check the development situations, and
   causes the first relay apparatus to discard the first alarms when the counted number of the first alarms is higher than a predetermined number.

14. The non-transitory computer-readable recording medium according to claim 11, the process further comprising:

checking, when a recovery notification notified upon a restoration from the failure is received, whether the recovery notification has been notified from any communication apparatus included in the particular communication network; and performing, when it is determined that the recovery notification has been notified from any communication apparatus included in the particular communication network, alarm matching processing for matching the discarded first alarms to a development situation of the first alarms after a predetermined period of time elapses.

15. The non-transitory computer-readable recording medium according to claim 14, the process further comprising:

causing, when the alarm matching processing is completed, the first relay apparatus to relay the first alarms.

* * * * *